US 6,531,102 B1

(12) United States Patent
Nakamura et al.

(10) Patent No.: US 6,531,102 B1
(45) Date of Patent: Mar. 11, 2003

(54) FUEL REFORMING APPARATUS

(75) Inventors: Masahito Nakamura, Wako (JP); Naoyuki Abe, Wako (JP); Kiyoshi Kasahara, Wako (JP); Shuichi Togasawa, Wako (JP); Yuji Asano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/559,098

(22) Filed: Apr. 27, 2000

(30) Foreign Application Priority Data

Apr. 30, 1999 (JP) .......................................... 11-125366

(51) Int. Cl.⁷ ................................................ B01J 10/00

(52) U.S. Cl. ........................ 422/198; 422/200; 422/201

(58) Field of Search ................................ 422/198, 200, 422/201; 196/104, 128; 159/3; 60/204, 260, 39.01, 772, 780

(56) References Cited

U.S. PATENT DOCUMENTS 2,925,329 A * 2/1960 Yost ............................ 392/399
4,946,667 A * 8/1990 Beshty ........................ 252/373

* cited by examiner

Primary Examiner—Glenn Caldarola
Assistant Examiner—Basia Ridley
(74) Attorney, Agent, or Firm—Arent Foc Kintner Plotkin & Kahn, PLLC (57) ABSTRACT

A fuel reforming apparatus is provided for generating a hydrogen-rich gas. The fuel reforming apparatus includes an evaporator comprising an evaporation chamber for evaporating the fuel vapor by evaporating a hydrocarbon fuel-water mixture by an evaporator using a combustion gas formed in a combustor; a heating chamber for heating the fuel vapor by a combustion gas output from the evaporation chamber; and a guiding path for guiding the combustion gas output from the evaporation chamber to the heating chamber along the floor of the evaporating room. In the heating chamber, the fuel vapor generated in the evaporation chamber is uniformly heated in an atmosphere with a homogeneous temperature of the combustion gas output from a heating medium tube, while the fuel vapor is circulating in the vapor tube.

9 Claims, 6 Drawing Sheets

FUEL REFORMING APPARATUS

BACKGROUND OF THE INVENTION

1. Field of the Invention

The present invention relates to a fuel reforming apparatus for generating a hydrogen-rich reformed gas to be supplied as a power generating fuel for a fuel cell, and particularly relates to an evaporator for forming the fuel gas used for the reformation reaction.

2. Background Art

For example, a solid polymer electrolyte-type fuel cell system is a power generating system comprising a fuel cell body formed by stacking laminates, each formed by a solid polymer electrolyte film sandwiched by an anode catalystic electrode and a cathode catalystic electrode. The power is generated by supplying the hydrogen-rich reformed gas formed by the fuel reforming apparatus and air (oxygen) to produce an electrochemical reaction. Recently, this solid polymer electrolyte-type fuel cell has become widely used as the driving power supply for automotive vehicles.

The fuel reforming apparatus mainly comprises an evaporator for evaporating a hydrocarbon (for example, methanol) fuel-water mixture, which includes hydrocarbons (for example, methanol) and water, a reformer for producing a hydrogen-rich reformed gas by introducing a fuel vapor through a reforming catalytic layer, and a CO removing device for selectively removing carbon monoxide in the reformed gas by introducing the fuel vapor through the selective oxidation catalytic layer.

In general, it is known that a boiler is used for generating a vapor, and it is also known that a stacking plate-type, shell-type or tube-type heat exchangers may be used for generating vapor. In addition, since the boiler has a capacity for producing a necessary amount of vapor and has an ability to store a considerable amount of vapor, the boiler can supply the necessary amount of vapor when necessary. However, when not necessary, the vapor valve must be closed. That is, the boiler must be provided with pressure tightness to be able to withstand the internal pressure rise at the time of closing the vapor room, so that the boiler inevitably become large, and thus, the boiler is not suitable for the automotive vehicles.

The plate type heat exchanger is advantageous in its high thermal efficiency. However, since it is necessary for the plate type heat exchanger to provide enough space for the passage for passing the combustion gas in order to avoid the pressure loss of the combustion gas from being compressed in the passage, the heat exchanger must be large.

In addition, since the plate-type heat exchanger is designed such that the vapor is sequentially obtained by vaporizing the liquid phase stored in the inside of the heat exchanger, it is not possible to stop vaporization when vapor is not necessary. If a valve is installed at the outlet of the plate type heat exchanger, the heat exchanger is required to be pressure tight and thus it becomes large.

Although the shell & tube-type heat exchanger has the advantageous feature that it is possible for the combustion gas as the heat source to flow with low pressure loss, it is necessary to improve the efficiency of the heat exchange for generating vapor. Furthermore, it is necessary to stabilize the temperature fluctuations because the vapor temperature fluctuates depending upon the load (the vapor temperature is high at low loads, but low at high loads).

The shell & tube heat exchanger is designed such that the combustion gas is passed through the tube, while a jet of the fuel is emitted on the outside surface of the tube. If the fuel falls to the bottom of the shell as liquid droplets due to scattering of the fuel during atomization, the hydrocarbon (for example, methanol) fuel-water mixture is collected at the bottom, making it difficult to stop the vaporization and to suspend the vapor supply when the vapor is not necessary. Furthermore, since the atomized fuel is directly blown onto the tube, the tube is subjected to severe thermal stress due to the cyclic contacts with combustion gas and hydrocarbon (for example, methanol) fuel-water mixture.

As shown above, the conventional boilers and heat exchangers do not satisfy the requirements for evaporators for on-vehicle fuel cell systems, i.e., small size, improved vaporization response (elimination of the evaporation residue by instantaneous evaporation), and high efficiency.

It is desired for the evaporator of the on-vehicle fuel cell to provide a long service life by constituting a structure capable of reducing the thermal stress during operation.

SUMMARY OF THE INVENTION

It is therefore an objective of the present invention to provide a small evaporator for an on-vehicle fuel cell capable of instantaneously evaporating the hydrocarbon (for example, methanol) fuel-water mixture, stabilizing the vapor temperature with respect to fluctuations of the load, and improving the durability by reducing the thermal stress.

In order to achieve the above objectives, the present invention provides a fuel reformer, used for generating a hydrogen-rich reformed gas by reforming a fuel vapor generated by evaporating a hydrocarbon (for example, methanol) fuel-water mixture into the fuel vapor by an evaporator, wherein said evaporator comprises: an evaporation chamber for generating the fuel vapor by blowing the atomized hydrocarbon (for example, methanol) fuel-water mixture on heating medium tubes, in which a combustion gas is circulated; and a heating chamber for heating the fuel vapor by circulating the combustion gas output from a vapor tube, in which the fuel vapor is conducted.

In the evaporation chamber, the hydrocarbon (for example, methanol) fuel-water mixture is atomized and blown on the heating medium tube, in which the combustion gas circulates, so that the hydrocarbon (for example, methanol) fuel-water mixture is instantaneously evaporated without leaving a residue. Thus, it is not only possible to form a necessary amount of fuel vapor instantaneously, but it is also possible to cut the fuel vapor effectively. Instantaneous evaporation of the hydrocarbon (for example, methanol) fuel-water mixture without leaving a residue prevents a rise of the internal pressure in the evaporation chamber and thus does not require a pressure tight structure.

In the heating chamber, the fuel vapor generated in the evaporation chamber is heated passing through the vapor tubes arranged in the combustion gas atmosphere, the fuel vapor can be heated homogeneously and the temperature of the heated gas can be stabilized, in contrast to the heating by sending the fuel vapor around the heating medium tubes in which the combustion gas passes. Thus, it becomes possible to supply a fuel vapor by maintaining a temperature of the fuel vapor suitable for reforming, even if the amount of fuel vapor fluctuates due to load fluctuations.

The present invention provides a construction such that the combustion gas output from the heating medium tubes is forwarded to the heating chamber through the guide path along the floor of the evaporation chamber, even when the hydrocarbon (for example, methanol) fuel-water mixture drops on the floor of the evaporation chamber, the liquid drops will be evaporated due to the heated floor of the evaporation chamber, which allows a more efficient cut of the fuel vapor.

The present invention provides an auxiliary evaporator for generating the fuel vapor by use of the combustion gas output from the evaporator, which makes it possible to compensate for a shortage of the fuel vapor when the necessary amount of the fuel vapor increases suddenly, so that the present fuel reforming system provides a superior response to the fluctuating demands for fuel vapor. In addition, since the combustion gas exhausted from the evaporation chamber is used as the heat source for the auxiliary evaporator, a new heat source is not required.

Furthermore, the present invention provides a structure in which the fuel vapor generated in the auxiliary evaporator is introduced into the evaporation chamber and is sent to the reformer after passing through the heating chamber, and it is possible to supply the fuel vapor including the original fuel vapor generated in the auxiliary evaporator after heating at a temperature suitable for reforming, even when the load requires a sudden increase of the original fuel vapor.

DETAILED DESCRIPTION OF THE INVENTION

A detailed embodiment of the present invention will be described hereinafter with reference to the attached drawings.

Figure 6:
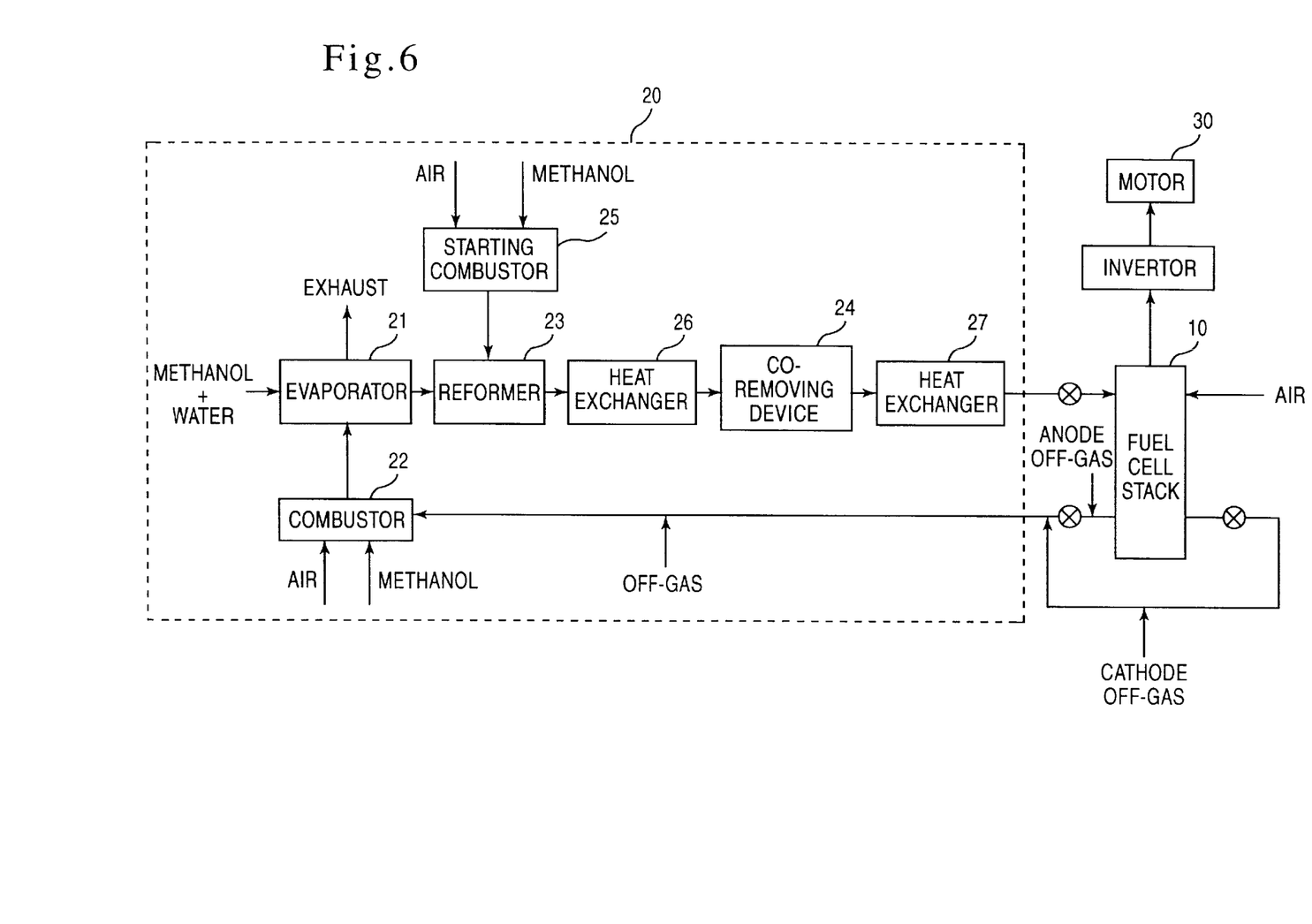
FIG. 6 is a general view of a whole fuel cell system constituted by the fuel reforming apparatus and the fuel cell of the present invention.

The structure of the whole fuel cell system comprising a fuel reforming apparatus according to the embodiments of the present invention is described with reference to FIG. 6. In FIG. 6, numeral 10 denotes the fuel cell body, 20 the fuel reforming apparatus, and 30 a motor.

The fuel reforming apparatus 20 comprises an evaporator 21 for forming the fuel vapor by evaporating the fuel composed of methanol and water (hydrocarbon (for example, methanol) fuel-water mixture) a combustor 22 for generating a combustion gas used for preheating the evaporator 21 and for evaporation of the fuel, a reformer 23 for generating a hydrogen-rich reformed gas by passing the fuel vapor through the reforming catalytic layer, a carbon monoxide (CO) removing device 24 for removing CO in the reformed gas by passing the reformed gas through the selective oxidization catalytic layer, and a starting combustor 25 for forming combustion gas used for preheating the reformer 23 and the CO removing device.

Figure 3:
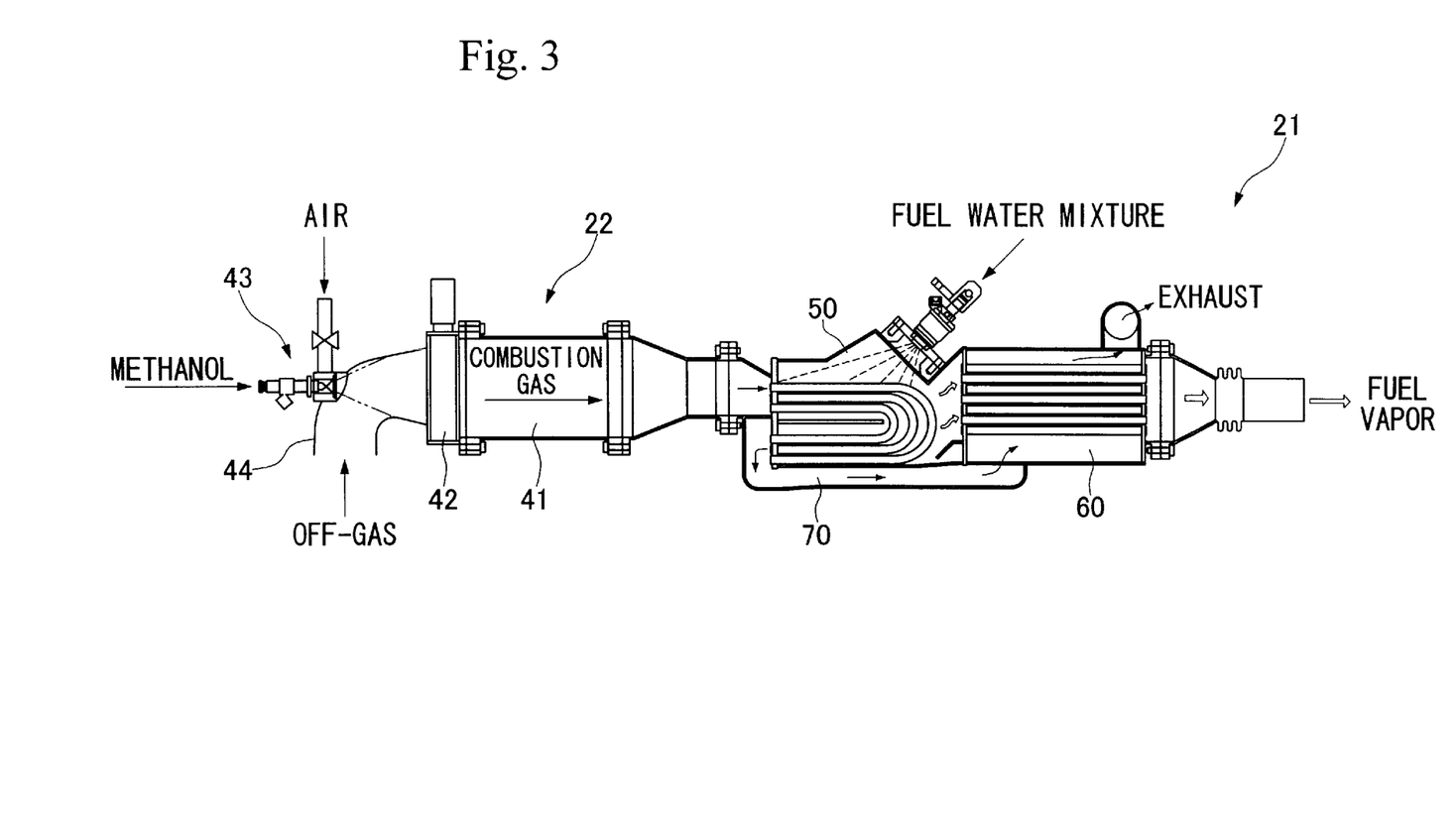
FIG. 3 is a cross sectional diagram showing a combination of the evaporator shown in FIG. 1 and a combustor connected at the front stage of the evaporator.

The combustor 22 comprises not only a combustion catalyst 41 for maintaining the combustion state and an electric heater 42, but also nozzles 43 for supplying the starting fuel (for example, methanol) and air (FIG. 3).

The combustor 22 also comprises an off gas tube 44 for returning the gas (called off-gas) containing the reformed gas generated from the starting operation to the stationary operation and the gas containing non-reacted hydrogen exhausted from the fuel cell body during stationary operation.

The starting combustor 25 has almost the same structure as that of the combustor 22. That is, the starting combustor stores the combustion catalyst for maintaining the combustion, a glow plug for ignition, and a nozzle for supplying the starting fuel (for example, methanol).

Figure 1:
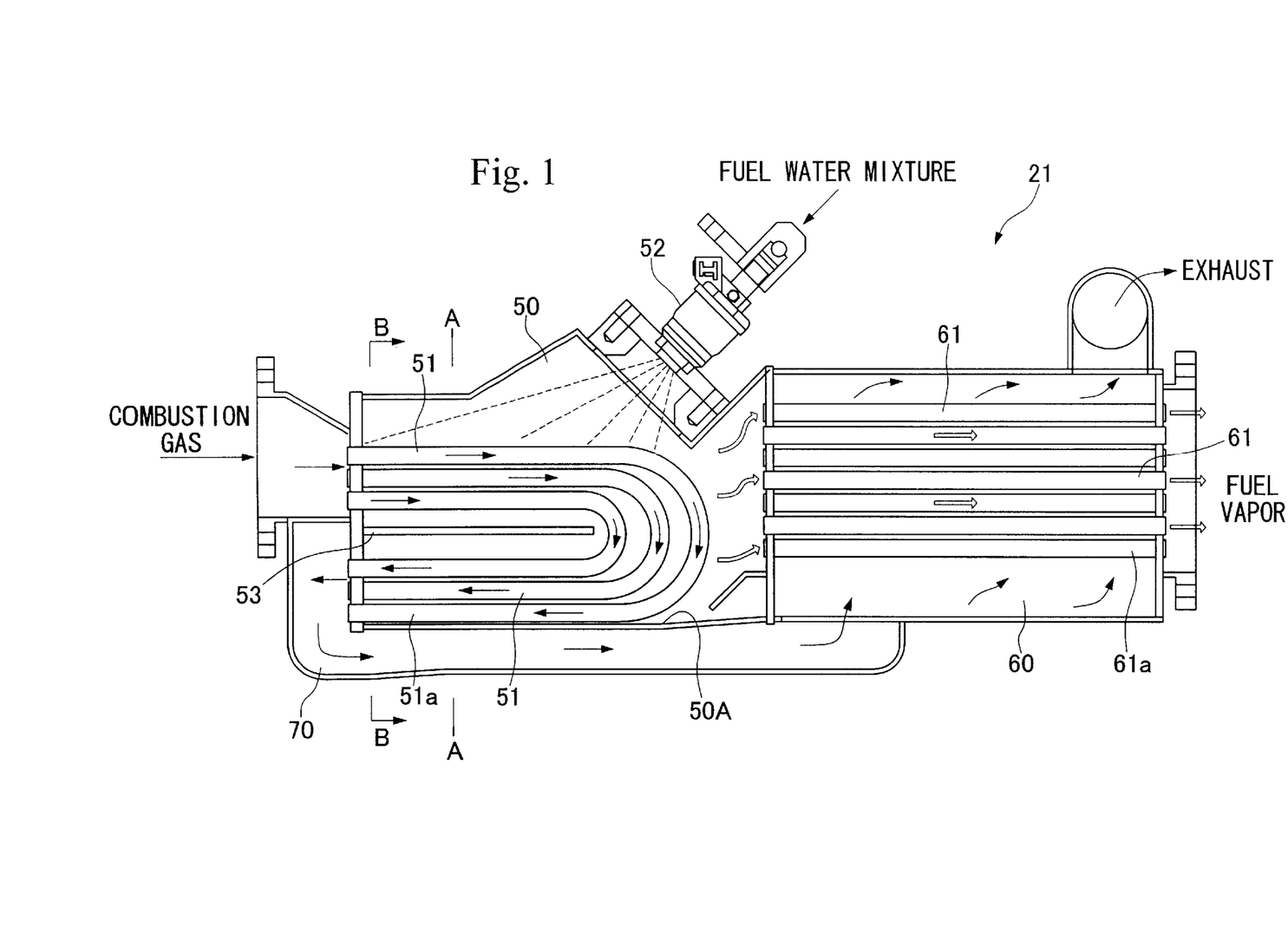
FIG. 1 is a longitudinal cross sectional view of an evaporator according to the first embodiment of the present invention.

The evaporator 21, as shown in FIGS. 1 and 3, comprises an evaporation chamber 50 for generating fuel vapor (shown by white arrows in FIG. 1) by evaporating the hydrocarbon (for example, methanol) fuel-water mixture by the combustion gas (shown as the black arrows in FIG. 1) generated by the combustor 22, a heating chamber 60 for heating the fuel gas generated in the evaporation chamber 50 by combustion gas supplied from the evaporation chamber 50, and, a guide path formed along the bottom surface of the evaporation chamber 50 for guiding the combustion gas from the combustor 22 to the heating chamber 60.

That is, in the evaporation chamber 50, there are provided a plurality of heating medium tubes 51 for passing the combustion gas and a nozzle 52 for igniting the hydrocarbon (for example, methanol) fuel-water mixture toward the heating medium tubes.

Figure 2A:
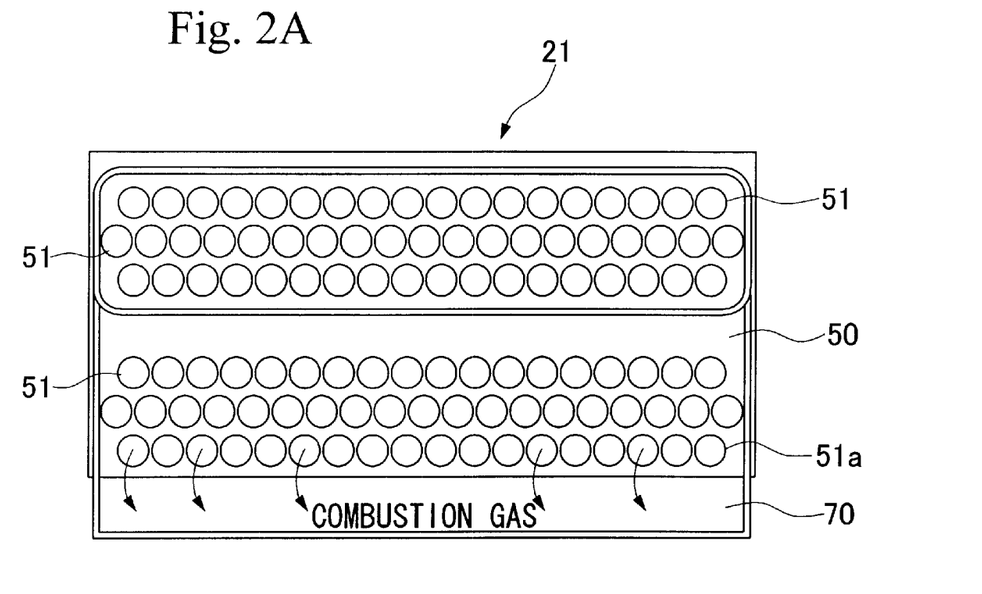
FIG. 2A is a cross sectional diagram along the A—A line in FIG. 1.
Figure 2B:
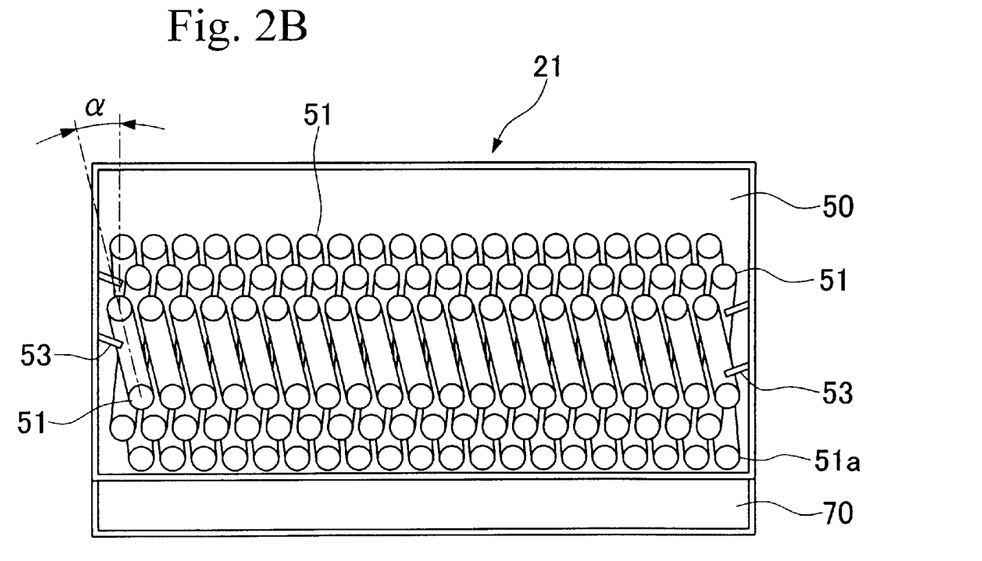
FIG. 2B is a cross sectional diagram along the B—B line in FIG. 1.

Those heating medium tubes 51 are formed into a U-shape with a rectangular cross sections and they are disposed in three stages so as to form a nested structure in the height direction, as shown in FIG. 1 and so as to abut each other in the width direction as shown in FIGS. 2A and 2B.

These heating medium tubes at each stage are arranged in a zigzag manner and the heating medium tubes at the outermost stage are located so as to be adjacent to the floor 50A of the evaporation chamber 50.

Furthermore, as shown in FIG. 2B, the heating medium tubes 51 of respective stages are disposed inclined by an angle of +α or −α degrees alternately. Numeral 53 in FIG. 2B denotes returning plates for returning scattered hydrocarbon (for example, methanol) fuel-water mixture on the heating medium tube.

In the heating chamber 60, a plurality of vapor tubes 61 are provided for circulating the fuel vapor generated in the evaporation chamber 50. These vapor tubes 61 are formed in linear tubes, one end of which is connected with the evaporation chamber 50, and the other end is connected with the reformer 23. A plurality of vapor tubes 61 are disposed in parallel in both the horizontal and vertical directions, and the vapor tube 61a at the lowermost position is positioned a little higher than the floor 50A of the vapor chamber 50.

The guide path 70 is used for sending the combustion gas exhausted from the outside of the evaporating room 50 through the heating medium tube 51 to the heating room 60 along the floor surface 50A of the evaporation chamber 50 and re-circulates the combustion gas from the upper stream of the floor surface 50A of the heating room 60.

The combustion gas which flows into the heating room 60 rises in the chamber, while passing around the vapor tube, heats the fuel vapor passing in the vapor tube 61, and is exhausted from the upper downstream of the heating chamber.

The reformer 23 is provided with a reforming catalytic layer which is formed by coating catalysts such as Ni, Ru, Rh, and Cu—Zn on the surface of the honeycomb structure.

When the fuel vapor output from the evaporator 21 is supplied to the reformer 23, a hydrogen-rich reformed gas will be generated by the auto-thermal reactions shown by the following formula.

$$CH_3OH + H_2O \rightarrow 3H_2 + CO_2 \quad (1)$$

$$CH_3OH + 2O_2 \rightarrow 2H_2O + CO_2 \quad (2)$$

The reaction represented by the formula (1) is a reforming reaction by use of methanol and water and hydrogen is generated by this reaction. The reaction formula (2) indicates an oxidation reaction of methanol, and the quantity of heat necessary for the endothermic reaction indicated by the reaction formula (1) is supplied by the reaction (2).

In the reformer 23, the methanol decomposition reaction shown by the reaction formula (3) inevitably takes place in addition to reactions (1) and (2).

$$CH_3OH \rightarrow 2H_2 + CO \quad (3)$$

Since carbon monoxide generated in the above reaction is a poison for the Pt catalyst, it reduces the generation efficiency of hydrogen by degrading the Pt catalyst in the fuel cell body 10, carbon monoxide is removed by the CO removing device 24 disposed in the downstream.

A heat exchanger 26 is equipped in between the reformer 23 and the CO removing device 24 in order to cool the reformed gas generated from the reformer 23 and in order to protect the selective oxidation catalyst in the CO removing device 24 from thermal damage.

A selective oxidation catalytic layer is formed by coating the catalyst such as Pt or Ru on the surface of the honeycomb structure of the CO removing device. When a mixture of the reformed gas and air is supplied to this CO removing device 24 after cooling by the heat exchanger 26, carbon monoxide contained in the reformed gas is removed by the following reaction.

$$2CO + O_2 \rightarrow 2CO_2 \quad (4)$$

The heat exchanger 27 is installed in between the CO removing device 24 and the fuel cell body 10.

Similar to the heat exchanger 26 disposed between the reformer 23 and the CO removing device 24, the heat exchanger 27 plays a role to cool the reformed gas output from the CO removing device 24 for protecting the Pt catalyst in the fuel cell body 10.

Hereinafter, an example of the operation of the fuel reforming apparatus 20 is described.

At the starting of the heat exchanger, since it is necessary to warm up the evaporator 21, the reformer 23, and the CO removing device 24, a mixture of methanol and oxygen-rich air is supplied to the combustion chamber 22 and the thus obtained combustion gas is supplied to the evaporator 21 for preheating the evaporator 21.

Similarly, a mixture of methanol and air is supplied to the starting combustor 25 and the combustion gas is supplied to the reformer 23 for preheating the reformer 23 and the CO removing device 24 equipped at the downstream of the reformer 23.

When the evaporator 21 reaches a temperature capable of evaporating the hydrocarbon (for example, methanol) fuel-water mixture and when the reforming catalytic layer (not shown) and the selective oxidation catalytic layer reaches the activation temperature, supply of methanol to the starting combustor 25 is suspended, and the hydrocarbon (for example, methanol) fuel-water mixture is supplied to the evaporator 21 through a nozzle 52.

In the evaporation chamber 50, since the hydrocarbon (for example, methanol) fuel-water mixture is sprayed on the heating medium tubes 51, in which the combustion gas circulates, the atomized hydrocarbon (for example, methanol) fuel-water mixture evaporates to the fuel vapor at the surface of the heating medium tubes 51.

At this time, the hydrocarbon (for example, methanol) fuel-water mixture directly sprayed on the outer surface of the heating medium tube 51, in which the high temperature gas generated at the combustor 22 passes, evaporates instantaneously, so that almost no residue remains.

Furthermore, since the heating medium tubes 51 are arranged in a zigzag manner, droplets of the hydrocarbon (for example, methanol) fuel-water mixture passing the upper heating medium tubes 51 stick on the lower tubes 51, and the scattered droplets are returned on the tubes 51 by the return plates 53, and the hydrocarbon (for example, methanol) fuel-water mixture is effectively prevented from falling on the floor 50A.

Therefore, the present fuel cell system is capable of supplying the necessary amount of fuel vapor to the reformer 23 by a designed amount of the hydrocarbon (for example, methanol) fuel-water mixture. In contrast, when the fuel vapor is not necessary (for example, when a car speed is being reduced, when this fuel cell system is installed in a car), the vapor flow can be effectively interrupted. In addition, since the internal pressure rise due to the gradual evaporation of the liquid residue can be avoided and a pressure-tight structure is not necessary for the fuel cell of the present invention, the evaporator 21 can be small.

The thus generated fuel vapor in the evaporation chamber 50 is introduced into the vapor tube 61 disposed in the heating chamber 60. Since the combustion gas output from the heating medium tube 51 is supplied into the heating chamber 60 through the guide path 70, the fuel vapor into the vapor tubes 61 is heated by heat exchange with the combustion gas circulating around the vapor tube 61.

The combustion gas output from the evaporation chamber 50 circulates along the floor surface 50A of the evaporation chamber 50. In addition, since the lowermost heating medium tube 51a is disposed close to the floor surface 50A, even if the hydrocarbon (for example, methanol) fuel-water mixture falls on the floor surface forming droplets by, for example, scattering, the liquid phase will evaporate effectively without accumulating on the floor 50A.

Furthermore, even if the hydrocarbon (for example, methanol) fuel-water mixture accumulates on the floor, since the inlets of the lowermost vapor tubes 61a are located higher than the floor surface 50A, the liquid will never flow into the vapor tube, which results in contributing to stabilization of the fuel vapor.

In the heating chamber 60, since the fuel vapor is heated while circulating in the vapor tubes 61 arranged in the combustion gas atmosphere, the fuel vapor can be heated under a homogeneous temperature, which is effective in stabilizing the fuel vapor temperature; in contrast to the inhomogeneous heating at the time of supplying the fuel vapor around the heating medium tubes 51, in which the combustion gas is circulated.

Therefore, even if the amount of the fuel vapor fluctuates from time to time due to fluctuations of the load on the fuel cell, it is possible to supply the fuel vapor, maintained at a suitable temperature, to the reformer 23.

In the reformer 23, the hydrogen-rich reformed gas is obtained by passing the fuel vapor through the reforming catalytic layer according to the reaction expressed in the formula (1).

Since the reformed gas generated in the reformer 23 is at an high temperature of around 300° C., the reformed gas is cooled to 100° C. by the heat exchanger 26 and sent to the CO removing device 24. In the CO removing device 24, the cooled reformed gas is passed through the selective oxidation catalytic layer for removing the carbon monoxide by the reaction shown as formula (4).

After removing the carbon monoxide in the CO removing device, the reformed gas is cooled by passing through the heat exchanger 27 for supplying to the fuel cell body 10 for power generation. The output power of the fuel cell is used for driving the motor 30. The off-gas containing non-reacted hydrogen exhausted from the fuel cell body 10 is re-circulated to the combustor 22 through the off-gas tube and is utilized again for combustion.

As shown above, the evaporator 21 according to an embodiment of the present invention allows instantaneous evaporation of the hydrocarbon (for example, methanol) fuel-water mixture and stabilization of the vapor temperature with respect to fluctuations of the load. Utilization of the U-shaped heating medium tubes 51 allows a reduction of the applied thermal stress to extend the service life of the heating medium tubes 51, and, adaptation of the rectangular box-type shell and tubes for the heat exchanger provides reduced pressure loss and allows efficient generation of the fuel vapor in a compact system, which indicates that this type of heat exchanger is suitable for the fuel cell system for installing in a car.

That is, as shown above, in the fuel cell system for installing in a car, the output of the fuel cell body 10 is determined by the output demanded by the motor 30. Thus, the fuel reforming apparatus 20 is required to generate a reformed gas, which contains the necessary amount of hydrogen for the fuel cell body 10 to generate the necessary output power, in response to the demand. The fuel reforming apparatus 20 of the present invention can satisfy the above requirements, since the present fuel reforming apparatus 20 comprises an evaporator 21, which has an excellent response property to the fluctuating output demand, in contrast to the conventional boilers or heat exchangers.

Figure 4:
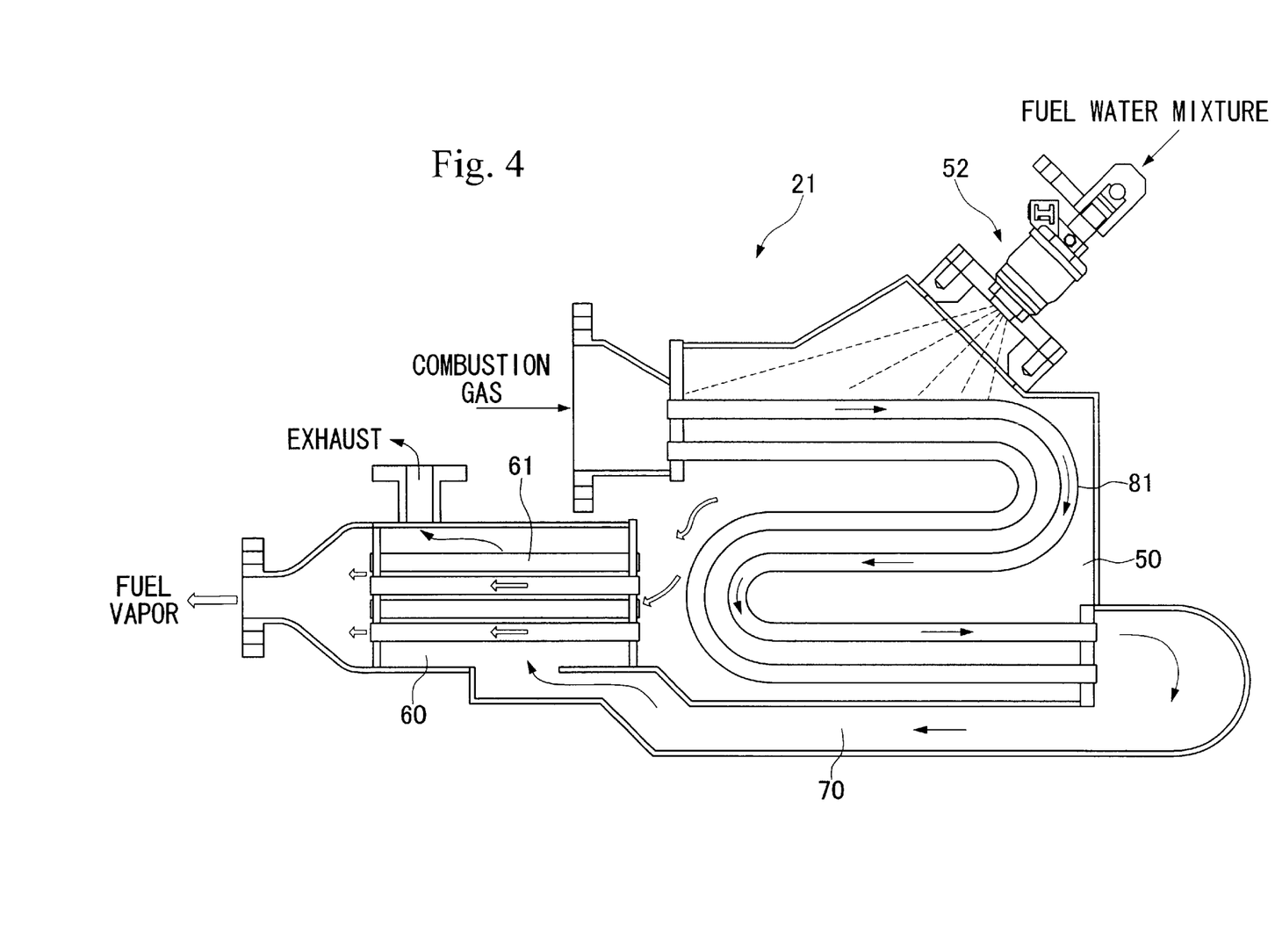
FIG. 4 is a longitudinal cross sectional view of an evaporator according to the second embodiment of the present invention.

It is noted that a three path heating medium tube 81 may be used instead of using the U-shaped heating medium tubes in the evaporator 21 in the evaporating chamber 50, as explained in the above-described embodiment. Furthermore, the heating medium tubes 51 and 81 may be piled up in more than 4 stages. In these cases, it is preferable to use such structures for the fuel cell system capable of outputting a high output power, because larger amounts of fuel vapor can be generated in such an evaporation chamber 50.

Figure 5:
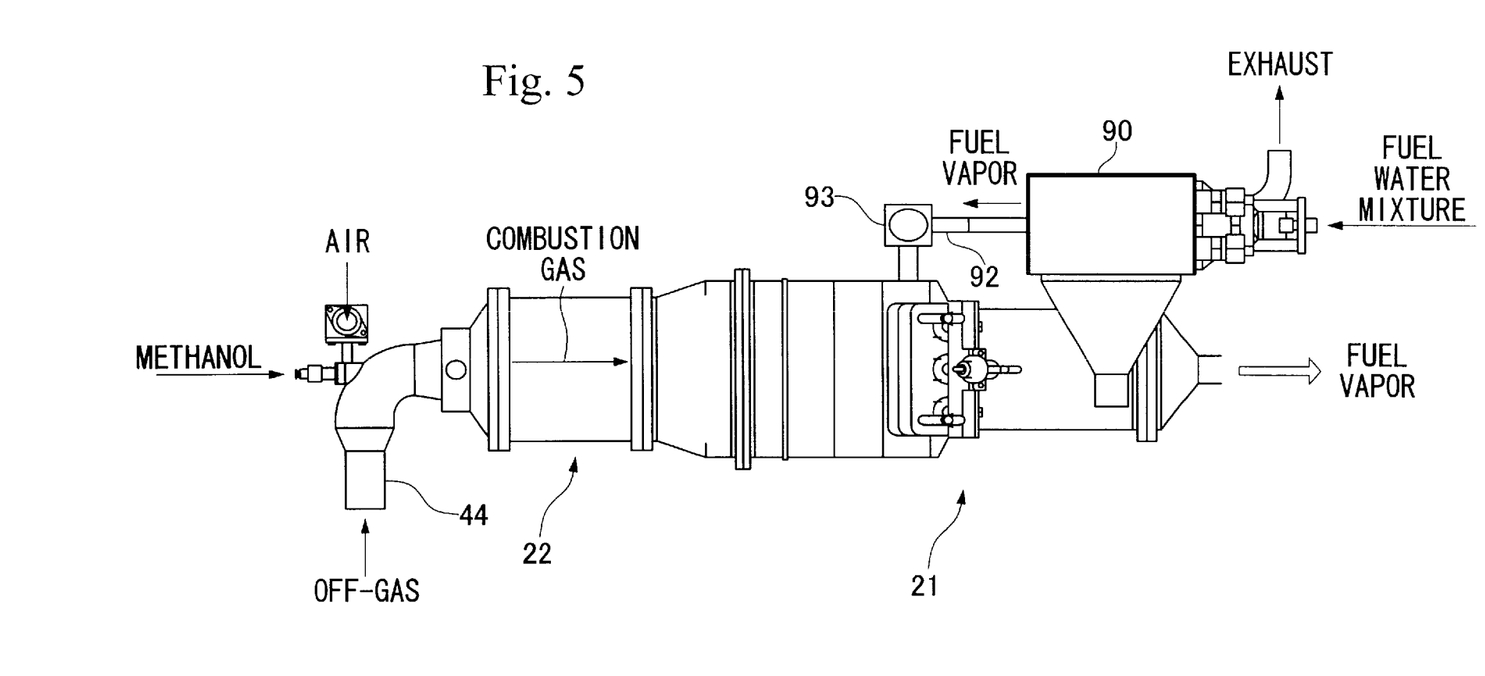
FIG. 5 is a plan view showing a combination of the evaporator shown in FIG. 1 and an auxiliary evaporator annexed to the evaporator.

Furthermore, as shown in FIG. 5, an auxiliary evaporator 90 may be supplementarily installed in addition to the evaporator 21, in order to supply a shortage of the fuel vapor generated in the evaporating chamber 50. The auxiliary evaporator 90 is used for evaporating the hydrocarbon (for example, methanol) fuel-water mixture and for generating the fuel vapor, wherein the combustion gas output from the heating chamber 60 is used as the heating medium for evaporation.

The auxiliary evaporator 90 is provided in order to supplementarily supply fuel vapor when a sudden increase of the fuel vapor is encountered, so that it is possible to use, for example, a plate type heat changer for generating the fuel vapor, because the vapor can be sequentially generated.

The fuel vapor generated by the auxiliary evaporator 90 is introduced in the evaporation chamber 50 of the evaporator 21 through the introduction tube 92, and the vapor amount is controlled by an ON/OFF valve 93 according to the desired output of the motor 30.

In the auxiliary evaporator 90, the original fuel is stored in the liquid phase and the combustion gas is also supplied from the heating chamber 60 of the evaporator 21, the fuel vapor is produced by sequential evaporation of the hydrocarbon (for example, methanol) fuel-water mixture. However, under the normal operation, since the ON/OFF valve 93 is closed, the liquid phase and the vapor phase are in equilibrium under a certain pressure.

When the necessary output of the motor 30 increases suddenly (for example, sudden departure from idling, or the sudden acceleration from low speed travel), since the evaporation chamber 50 of the evaporator 21 cannot generate the necessary amount of the fuel vapor suddenly, the ON/OFF valve 93 is opened based on the acceleration signal for supplying the fuel vapor generated in the auxiliary evaporator 90 to the evaporation chamber 50.

The fuel vapor from the auxiliary evaporator 90 is mixed with the fuel vapor generated in the evaporation chamber 50, is heated in the heating chamber 60 while circulating in the vapor tubes 61, and the necessary amount of fuel vapor corresponding to the required output is delivered to the reformer 23.

The structure in which the auxiliary evaporator 90 is provided together with the evaporator 21 exhibits a superior response property, because a shortage of the fuel vapor due to insufficient instantaneous fuel vapor generation capacity of the evaporator 21 can be timely compensated by the auxiliary evaporator 90.

In addition, since the combustion gas output from the evaporator 21 is used as the heat source for generating the fuel vapor by the auxiliary evaporator 90, it is not necessary to provide a new heat source for the auxiliary evaporator 90, which results in improving the energy efficiency in the vapor generating system.

Furthermore, since a structure is adopted in which the fuel vapor generated in the auxiliary evaporator 90 is heated in the heating chamber 60 through the vapor tubes 61 after mixing with the fuel vapor generated by the evaporator 21, the response property is further improved because not only can the necessary amount of the fuel vapor be compensated, but also, the necessary amount of the fuel vapor including the compensated fuel vapor can be supplied to the reformer 23 after heating at the appropriate temperature for reforming.

As clearly described in the above explanation, the present invention has the following effects.

(a) In the present fuel vapor supplying system, the hydrocarbon (for example, methanol) fuel-water mixture is instantaneously evaporated by atomizing the fuel on the heating medium tube, in which the combustion gas circulates, without leaving a residue, and the necessary amount of the fuel vapor can be obtained accurately and the vapor supply can be suspended effectively when the vapor supply becomes unnecessary.

In addition, the present fuel evaporator is designed so as to avoid an increase of the internal pressure so that the evaporator as well as the fuel reforming apparatus can have a small size.

(b) Since the fuel vapor generated in the evaporation chamber can be heated by passing through the vapor tube arranged in the combustion gas atmosphere, the temperature of the fuel vapor can be stabilized, even when the fuel vapor supply fluctuates. Accordingly, even if the amount of the generated fuel vapor changes in response to the load change, the fuel vapor supplied to the reformer can be maintained at a temperature suitable for reforming.

(c) The present system is designed such that the combustion gas output from the heating medium tube is supplied to the heating room flowing along the floor of the evaporation chamber. Thus, even if the hydrocarbon (for example, methanol) fuel-water mixture drops onto the floor without instantaneous evaporation, the hydrocarbon (for example, methanol) fuel-water mixture droplets can be evaporated because of the heated floor, and the fuel vapor supply can be effectively suspended when the fuel vapor becomes unnecessary.

(d) Provision of the auxiliary evaporator for generating fuel vapor by utilizing the combustion gas output from the evaporator makes it possible to supply fuel vapor to compensate for the shortage, when a sudden increase of the fuel vapor is, required for the sudden increase of the load, which results in providing a superior response to the fuel vapor demand. In addition, since the combustion gas output from the evaporator is used as a heat source for generating the fuel vapor by the auxiliary evaporator, the provision of a new heat source is not necessary and the energy efficiency of the present system as a whole for generating the fuel vapor is maintained at a high level.

(e) The fuel vapor generated in the auxiliary evaporator is introduced in the evaporation chamber and then supplied to the reformer, so that the fuel vapor generated in the auxiliary evaporator is heated similarly to the fuel vapor generated by the evaporator. Accordingly, the provision of the auxiliary evaporator not only capable of supplying the necessary amount of the fuel vapor when the load increases suddenly, but also capable of supplying the fuel vapor to the reformer after adjusting the temperature of the fuel vapor as. a whole, results in further improving the response property of the system in response to the sudden increase of the fuel demand.

What is claimed is:

1. A fuel reforming apparatus, used for generating a hydrogen-rich reformed gas by reforming a fuel vapor generated by evaporating a hydrocarbon fuel-water mixture by the fuel reforming apparatus comprising a first evaporator and a reformer, said first evaporator comprising, an evaporation chamber including heating medium tubes, the evaporation chamber generating the fuel vapor by blowing an atomized hydrocarbon fuel-water mixture on the heating medium tubes, in which a combustion gas is circulated and outputted; and a heating chamber, which is disposed adjacent to said evaporation chamber for heating the fuel vapor, and which includes a plurality of fuel vapor tubes, the fuel vapor passing in the fuel vapor tubes, wherein the heating chamber heats the fuel vapor by circulating the combustion gas output from the heating medium tubes around said fuel vapor tubes.

2. A fuel reforming apparatus according to claim 1, wherein said first evaporator comprises a guide path, which forwards the combustion gas output from said heating medium tubes to said heating chamber along a floor of said first evaporator.

3. A fuel reforming apparatus according to claim 2, wherein the fuel reforming apparatus further comprises an auxiliary evaporator for generating supplemental fuel vapor using combustion gas output from said heating chamber as a heating medium.

4. A fuel reforming apparatus according to claim 3, wherein the supplemental fuel vapor generated by said auxiliary evaporator is introduced into said evaporation chamber through an introduction tube and then forwarded to the reformer, after passing through said heating chamber.

5. A fuel reforming apparatus according to claim 1, wherein the fuel reforming apparatus further comprises an auxiliary evaporator for generating supplemental fuel vapor using combustion gas output from said heating chamber as a heating medium.

6. A fuel reforming apparatus according to claim 5, wherein the supplemental fuel vapor generated by said auxiliary evaporator is introduced into said evaporation chamber through an introduction tube and then forwarded to the reformer, after passing through said heating chamber.

7. A fuel reforming apparatus according to claim 1, wherein a plurality of said heating medium tubes formed into U-shape tubes are arranged in the evaporation chamber.

8. A fuel reforming apparatus according to claim 1, wherein a plurality of said heating medium tubes are arranged separately in a plurality of adjacent stages in said evaporation chamber and heating medium tubes in each stage are arranged in a zigzag manner.

9. A fuel reforming apparatus according to claim 8 wherein heating medium tubes arranged in one stage are inclined upwardly while heating medium tubes in the adjacent stage are inclined downwardly.

* * * * *